United States Patent
Yang et al.

(10) Patent No.: US 12,367,681 B2
(45) Date of Patent: Jul. 22, 2025

(54) SIMULATING VIEWPOINT TRANSFORMATIONS FOR SENSOR INDEPENDENT SCENE UNDERSTANDING IN AUTONOMOUS SYSTEMS

(71) Applicant: NVIDIA Corporation, Santa Clara, CA (US)

(72) Inventors: Zongyi Yang, Eatontown, NJ (US); Mariusz Bojarski, Lincroft, NJ (US); Bernhard Firner, Highland Park, NJ (US); Urs Muller, Keyport, NJ (US)

(73) Assignee: NVIDIA Corporation, Santa Clara, CA (US)

(*) Notice: Subject to any disclaimer, the term of this patent is extended or adjusted under 35 U.S.C. 154(b) by 318 days.

(21) Appl. No.: 17/448,247

(22) Filed: Sep. 21, 2021

(65) Prior Publication Data
US 2022/0092317 A1    Mar. 24, 2022

Related U.S. Application Data

(60) Provisional application No. 63/081,008, filed on Sep. 21, 2020.

(51) Int. Cl.
*G06V 20/56* (2022.01)
*G05B 13/02* (2006.01)
(Continued)

(52) U.S. Cl.
CPC ......... *G06V 20/56* (2022.01); *G05B 13/0265* (2013.01); *G06F 18/214* (2023.01);
(Continued)

(58) Field of Classification Search
None
See application file for complete search history.

(56) References Cited

U.S. PATENT DOCUMENTS 10,007,269 B1   6/2018   Gray
10,134,278 B1   11/2018  Konrardy et al.
(Continued)

FOREIGN PATENT DOCUMENTS

CN   107121952 A   9/2017
CN   111373458 A   7/2020

OTHER PUBLICATIONS

Lin et al. ("A Vision Based Top-View Transformation Model for a Vehicle Parking Assistant", Sensors 2012,). (Year: 2012).*
(Continued)

*Primary Examiner* — Randolph I Chu
(74) *Attorney, Agent, or Firm* — Taylor Duma L.L.P.

(57) ABSTRACT

In various examples, sensor data used to train an MLM and/or used by the MLM during deployment, may be captured by sensors having different perspectives (e.g., fields of view). The sensor data may be transformed—to generate transformed sensor data—such as by altering or removing lens distortions, shifting, and/or rotating images corresponding to the sensor data to a field of view of a different physical or virtual sensor. As such, the MLM may be trained and/or deployed using sensor data captured from a same or similar field of view. As a result, the MLM may be trained and/or deployed—across any number of different vehicles with cameras and/or other sensors having different perspectives—using sensor data that is of the same perspective as the reference or ideal sensor.

20 Claims, 13 Drawing Sheets

(51) Int. Cl.
| | |
|---|---|
| G06F 18/214 | (2023.01) |
| G06F 18/25 | (2023.01) |
| G06T 3/60 | (2006.01) |
| G06T 5/80 | (2024.01) |
| G06T 7/11 | (2017.01) |
| G06V 10/25 | (2022.01) |

(52) U.S. Cl.
CPC .............. *G06F 18/251* (2023.01); *G06T 3/60* (2013.01); *G06T 5/80* (2024.01); *G06T 7/11* (2017.01); *G06V 10/25* (2022.01); *G06T 2207/20081* (2013.01); *G06T 2207/20132* (2013.01); *G06T 2207/30241* (2013.01); *G06T 2207/30252* (2013.01)

(56) References Cited

U.S. PATENT DOCUMENTS

| | | | | |
|---|---|---|---|---|
| 10,832,418 | B1* | 11/2020 | Karasev | G06T 7/579 |
| 10,885,698 | B2 | 1/2021 | Muthler et al. | |
| 10,997,433 | B2* | 5/2021 | Xu | G05D 1/0221 |
| 11,042,163 | B2 | 6/2021 | Chen et al. | |
| 11,107,228 | B1* | 8/2021 | Shrivastava | G06T 11/00 |
| 11,170,524 | B1* | 11/2021 | Mishra | B64C 39/024 |
| 11,610,115 | B2* | 3/2023 | Kar | G06T 11/00 |
| 11,698,272 | B2* | 7/2023 | Kroepfl | G01S 13/931 |
| | | | | 701/409 |
| 11,804,042 | B1* | 10/2023 | Alokhina | G06V 10/776 |
| 11,823,433 | B1* | 11/2023 | Paz-Perez | G06V 10/82 |
| 2016/0321074 | A1 | 11/2016 | Hung et al. | |
| 2017/0010108 | A1 | 1/2017 | Shashua | |
| 2017/0259801 | A1 | 9/2017 | Abou-Nasr et al. | |
| 2017/0364083 | A1 | 12/2017 | Yang et al. | |
| 2018/0121273 | A1 | 5/2018 | Fortino et al. | |
| 2019/0071101 | A1 | 3/2019 | Emura et al. | |
| 2019/0310650 | A1 | 10/2019 | Halder | |
| 2019/0384304 | A1 | 12/2019 | Towal et al. | |
| 2020/0082567 | A1* | 3/2020 | Liu | G06T 7/248 |
| 2020/0257301 | A1* | 8/2020 | Weiser | G06N 3/02 |
| 2022/0092349 | A1* | 3/2022 | Yang | G06V 20/56 |
| 2023/0110713 | A1* | 4/2023 | Degirmenci | G06N 3/0442 |
| | | | | 701/24 |
| 2023/0259540 | A1* | 8/2023 | Das | G06F 16/38 |
| | | | | 704/9 |
| 2023/0274151 | A1* | 8/2023 | Xu | G06N 3/086 |
| | | | | 706/15 |
| 2024/0077331 | A1* | 3/2024 | Yin | G06V 10/803 |

OTHER PUBLICATIONS

How can we get the driver view?• Issue #1636 • carla-simulator/carla, https://github.com/carla-simulator/carla/issues/1636, May 2019 (Year: 2019).*

Dekel et al. "Moving Camera, Moving People: A Deep Learning Approach to Depth Prediction", Google Research, https://research.google/blog/moving-camera-moving-people-a-deep-learning-approach-to-depth-prediction/, May 2019 (Year: 2019).*

International Preliminary Report on Patentability for PCT Application No. PCT/US2021/051286, filed Sep. 21, 2021, mailed Mar. 30, 2023, 8 pgs.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

Abdi, L., and Meddeb, A., "Driver information system: a combination of augmented reality, deep learning and vehicular Ad-hoc networks", Multimedia Tools Applications, vol. 77, No. 12, pp. 14763-14703 (2018) , published online on Aug. 3, 2017.

Bojarski, M., et al., "End to End Learning for Self-Driving Cars", arXiv:1604.073v16v1 [cs.CV], pp. 1-9 (Apr. 25, 2016), XP055570062.

Lecun, Y., et al., "Off-Road Obstacle Avoidance through End-to-End Learning", In Advances in Neural Information Processing Systems, pp. 1-8 (2006).

Pomerleau, D. A., "ALVINN: An Autonomous Land Vehicle in a Neural Network", In Advances in Neural Information Processing Systems, pp. 305-313 (Jan. 1989).

Reiher, L., et al., "A Sim2Real Deep Learning Approach for the Transformation of Images from Multiple Vehicle-Mounted Cameras to a Semantically Segmented Image in Bird's Eye View", arXiv:200504078v1 [cs.CV], Cornell University Library, 201 Olin Library Cornell University, pp. 1-7 (May 8, 2020).

Tian, Y., et al., "Training and Testing Object Detectors With Virtual Images", IEEE/CAA Journal of Automatica Sinica, Chinese Association of Automation (CAA), vol. 5, No. 2, pp. 539-546 (Mar. 2018), XP011676953.

"Methodology of Using a Single Controller (ECU) for a Fault-Tolerant/Fail-Operational Self-Driving System", U.S. Appl. No. 62/524,283, filed Jun. 23, 2017.

"Systems and Methods for Safe and Reliable Autonomous Vehicles", U.S. Appl. No. 62/584,549, filed Nov. 10, 2017.

"System and Method for Controlling Autonomous Vehicles", U.S. Appl. No. 62/614,466, filed Jan. 7, 2018.

"System and Method for Safe Operation of Autonomous Vehicles", U.S. Appl. No. 62/625,351, filed Feb. 2, 2018.

"Conservative Control for Zone Driving of Autonomous Vehicles Using Safe Time of Arrival", U.S. Appl. No. 62/628,831, filed Feb. 9, 2018.

"System and Method for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-lime object detection and for determining confidence of object detection suitable for Autonomous vehicles", U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Convolutional Neural Networks to Detect Drivable Freespace for Autonomous Vehicles", U.S. Appl. No. 62/643,665, filed Mar. 15, 2018.

"Geometric Shadow Filter for Denoising Ray-Traced Shadows", U.S. Appl. No. 62/644,385, filed Mar. 17, 2018.

"Energy Based Reflection Filter for Denoising Ray-Traced Glossy Reflections", U.S. Appl. No. 62/644,386, filed Mar. 17, 2018.

"Distance Based Ambient Occlusion Filter for Denoising Ambient Occlusions", U.S. Appl. No. 62/644,601, filed Mar. 19, 2018.

"Adaptive Occlusion Sampling of Rectangular Area Lights with Voxel Cone Tracing", U.S. Appl. No. 62/644,806, filed Mar. 19, 2018.

"Deep Neural Network for Estimating Depth from Stereo Using Semi-Supervised Learning", U.S. Appl. No. 62/646,148, filed Mar. 21, 2018.

"Video Prediction Using Spatially Displaced Convolution", U.S. Appl. No. 62/646,309, filed Mar. 21, 2018.

"Video Prediction Using Spatially Displaced Convolution", U.S. Appl. No. 62/647,545, filed Mar. 23, 2018.

"System and Methods for Advanced AI-Assisted Vehicles", U.S. Appl. No. 62/648,358, filed Mar. 26, 2018.

"System and Method for Training, Testing, Verifying, and Validating Autonomous and Semi-Autonomous Vehicles", U.S. Appl. No. 62/648,399, filed Mar. 27, 2018.

"Method and System of Remote Operation of a Vehicle Using an Immersive Virtual Reality Environment", U.S. Appl. No. 62/648,493, filed Mar. 27, 2018.

(56) References Cited

OTHER PUBLICATIONS

"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
International Search Report and Written Opinion received for PCT Patent Application No. PCT/US2021/051286, mailed on Dec. 6, 2021, 11 pages.

\* cited by examiner

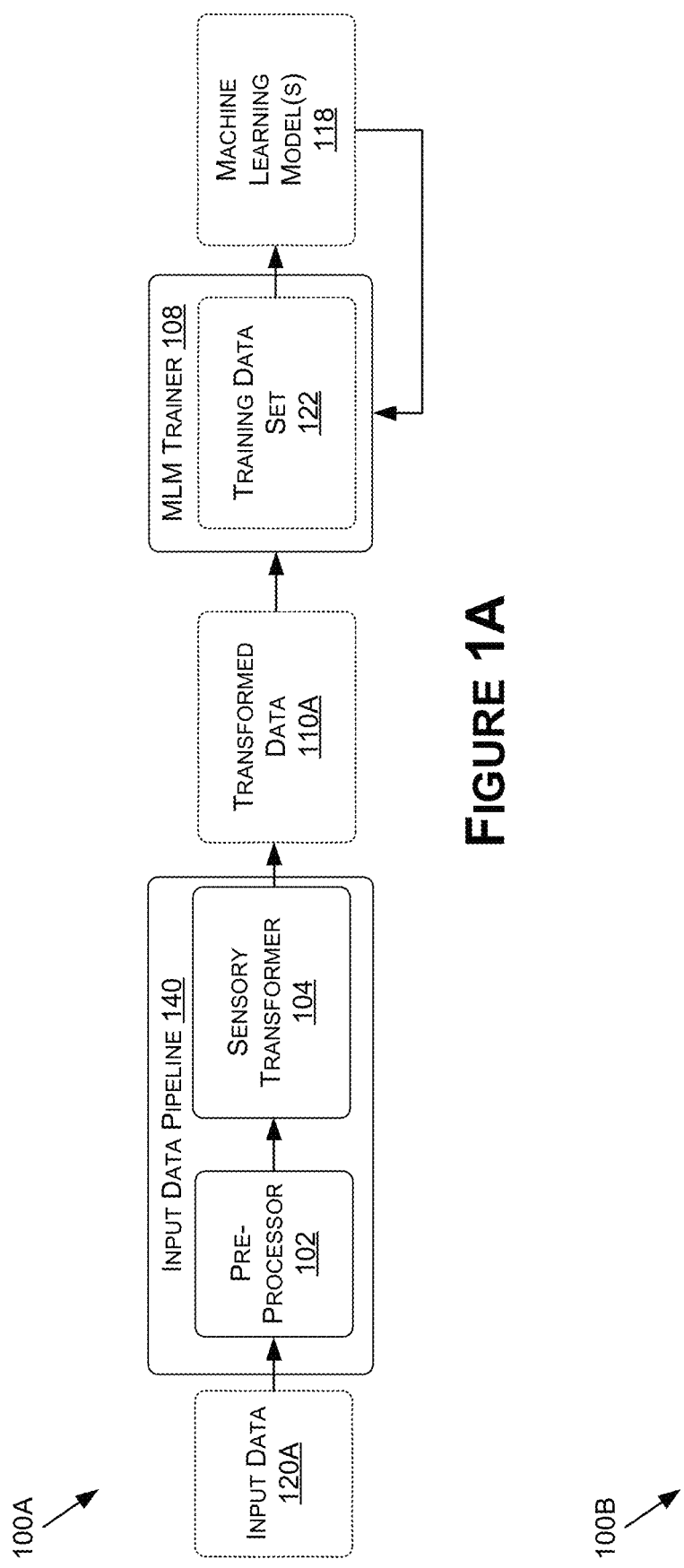
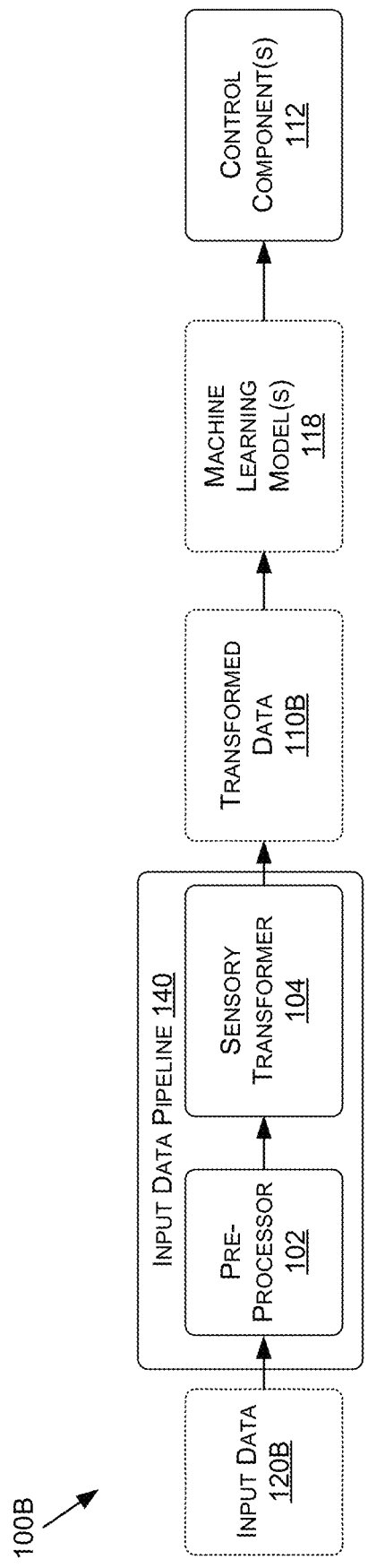
FIGURE 1A
FIGURE 1B

SIMULATING VIEWPOINT TRANSFORMATIONS FOR SENSOR INDEPENDENT SCENE UNDERSTANDING IN AUTONOMOUS SYSTEMS

CROSS-REFERENCE TO RELATED APPLICATIONS

This application claims the benefit of U.S. Provisional Application No. 63/081,008, filed on Sep. 21, 2020, which is hereby incorporated by reference in its entirety.

BACKGROUND

Designing a system to drive a vehicle autonomously without supervision at a level of safety required for practical acceptance is tremendously difficult. An autonomous vehicle should at least be capable of performing as a functional equivalent of an attentive driver, who draws upon a perception and action system that has an incredible ability to identify and react to moving and static obstacles in a complex environment in order to avoid colliding with other objects or structures along its path. Perception for an autonomous vehicle may be accomplished using scene computer vision and understanding algorithms that rely on applying images captured by a camera of the vehicle to a convolutional neural network (CNN). The accuracy of the perception degrades as camera characteristics, such as camera location, orientation, field of view, or lens distortion depart from values of the camera used to train the neural network (NN). For example, if a neural-network is trained with a camera mounted on the windshield of a low-slung sports car, the system accuracy can degrade or the system can even fail if it is used with a camera mounted on a vehicle with a taller chassis, such as an sports utility vehicle (SUV) or truck. Additionally, images used to train the neural network should generally share similar camera characteristics with one another, such as by being captured by the same camera.

Conventionally, differences in characteristics of cameras used to generate images for training and deployment are minimized by using a family of neural networks, each trained and deployed using consistent camera characteristics. For example, a different neural network may be trained and deployed for each vehicle year, make, and/or model using consistent camera characteristics throughout. However, this approach requires large quantities of training data that is expensive and time-consuming to collect. It also requires significant compute resources to train since separate training is required for each network. Additionally, each neural network needs to be maintained and updated separately, consuming storage and bandwidth.

SUMMARY

Embodiments of the present disclosure relate to applying viewpoint transformations for sensor independent scene understanding. Systems and methods are disclosed that provide for image data and/or other sensor data to be transformed in order to compensate for differences in sensor characteristics of sensors used to capture the sensor data. The transformed sensor data may be applied to a machine learning model (MLM) for training and/or inference, resulting in improved perception.

In contrast to conventional approaches, such as those described above, sensor data used to train an MLM, such as a deep neural network (DNN), and/or sensor data used by the NN during deployment, may be captured by sensors (e.g., cameras) having different perspectives (e.g., fields of view, locations, and orientations with respect to a specific vehicle, ground plane, or other point of reference, etc.). In such examples, the sensor data may be transformed—to generate transformed sensor data—such as by altering or removing lens distortions, shifting, rotating, cropping, and/or extracting at least one region of interest (ROI) from images corresponding to the sensor data to a field of view of a different physical or virtual sensor. As such, the MLM may be trained and/or deployed using sensor data captured from a same or similar field of view. As a result, the MLM may be trained and/or deployed—across any number of different vehicles with cameras and/or other sensors having different perspectives—using sensor data that is of the same perspective as the reference or ideal sensor. This process increases the scalability of the system while removing vehicle specific dependencies to generate a machine learning model that is deployable in any number of different vehicles.

BRIEF DESCRIPTION OF THE DRAWINGS

The present systems and methods for applying viewpoint transformations for sensor independent scene understanding are described in detail below with reference to the attached drawing figures, wherein:

FIG. 1A is a data flow diagram illustrating an example of a machine learning model training system performing a process for transforming sensor data, in accordance with some embodiments of the present disclosure;

FIG. 1B is a data flow diagram illustrating an example of a machine learning model inferencing system performing a process for transforming sensor data, in accordance with some embodiments of the present disclosure;

DETAILED DESCRIPTION

Figure 2A:
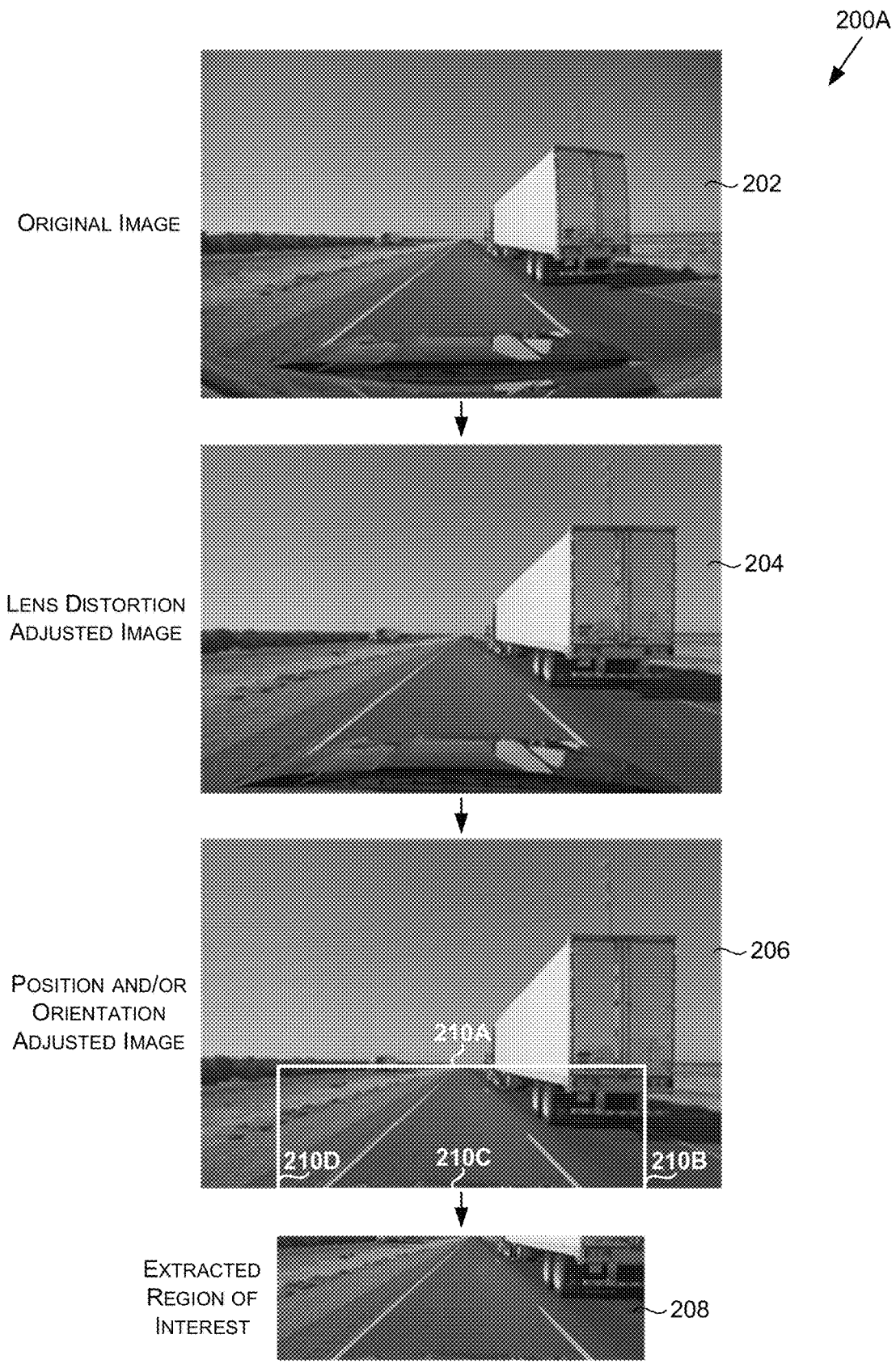
FIG. 2A is a data flow diagram illustrating an example data flow of transforming fields of view using a region of interest and one or more intermediate images, in accordance with some embodiments of the present disclosure.

Systems and methods are disclosed related to applying viewpoint transformations for sensor independent scene understanding. Although the present disclosure may be described with respect to an example autonomous vehicle 700 (alternatively referred to herein as "vehicle 700" or "ego-vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, this is not intended to be limiting, and the systems and methods described herein may be used in augmented reality, virtual reality, mixed reality, robotics, security, and surveillance, autonomous or semi-autonomous machine applications, and/or any other technology spaces where machine learning may be used. Further, although the present disclosure is primarily described using examples of sensors in the form of cameras, disclosed techniques may be used to apply transformations for any suitable form of sensor (e.g., to transform a sensory field thereof).

In various embodiments, sensor data used to train an MLM, such as a deep neural network (DNN), and/or sensor data used by the NN during deployment, may be captured by sensors (e.g., cameras) having different perspectives (e.g., fields of view, locations and orientations with respect to a specific vehicle, ground plane, or other point of reference, etc.). In such examples, the sensor data may be transformed—to generate transformed sensor data—such as by altering or removing lens distortions, shifting, rotating, cropping, and/or extracting ROIs from images corresponding to the sensor data to a field of view of a different physical or virtual sensor. As such, the MLM may be trained and/or deployed using sensor data captured from a same or similar field of view. As a result, the MLM may be trained and/or deployed—across any number of different vehicles with cameras and/or other sensors having different perspectives—using sensor data that is of the same perspective as the reference or ideal sensor. This process increases the scalability of the system while removing vehicle specific dependencies to generate a machine learning model that is deployable in any number of different vehicles.

Transforming the sensor data to convert the sensor data to a different field of view may include adjusting (e.g., removing, reducing, or altering) lens distortion captured by the sensor data. For example, the lens distortion may correspond to lens characteristics of a camera, which impact the field of view, such as the angle of view. In at least one embodiment, the lens distortion may include lighting distortion (e.g., a vignetting effect), perspective distortion (such as wide-angle distortion or extension distortion), and/or compression distortion. In at least one embodiment, the lens distortion may include optical distortion, such as barrel distortion, pincushion distortion, and/or mustache distortion. In one or more embodiments, the lens distortion may be converted to simulate lens distortion of a different lens and/or camera. In at least one embodiment, the sensor data may be converted to a lens-independent format, for example, by removing the lens distortion. For example, images used in training and/or deployment may be transformed so as to appear as the images were captured by an ideal camera (e.g., an ideal pinhole camera where a single light ray may enter the camera for each point in the scene).

Transforming the sensor data to convert the sensor data to a different field of view may include shifting, rotating, cropping, and/or extracting ROIs from images (or other sensor data format) corresponding to the sensor data to a perspective. For example, a viewpoint transform may be used to transform camera images to emulate a shift and/or rotation of the camera. This may be used to account for cameras and/or sensors positioned differently (e.g., left or right of center, up or down with respect to a ground plane and/or other world-reference point, etc.).

Transforming the sensor data to convert the sensor data to a different field of view may additionally or alternatively include extracting a region of interest (ROI) from one or more images that correspond to the sensor data. For example, boundaries of the ROI may be determined in an image, with the boundaries corresponding to the field of view. Pixels within the boundaries may be used to generate the ROI corresponding to the field of view. The ROI may be incorporated into at least one image, which may be used as an input to an MLM. In at least one embodiment, one or more of the boundaries may be determined in world space. By determining a boundary in world space, the content of the ROI can be made consistent for images generated using different camera characteristics. In at least one embodiment, side boundaries may be determined to set an angle that defines a horizontal field of view. Applying a flat ground assumption, a top boundary may be selected to align with a horizon line and/or a reference line. A bottom boundary may be adjusted to correspond to a section of the ground of a particular or fixed width in world space.

In at least one embodiment, the boundaries may be used to select (e.g., extract) a subset of pixels from an image that correspond to the ROI. One or more of the transformations may be applied to the pixels to produce another image corresponding to the ROI. For example, a transform(s) may be incorporated in a lookup table, which may indicate for each destination pixel(s) in the image corresponding to the ROI, a source pixel(s) in the image to be used to generate the destination pixel(s). Pixels for the ROI may then be directly generated from only the relevant pixels of the source image. By directly generating the pixels for the ROI, one or more transformations may only be applied to pixels needed for generating the ROI, as opposed to an entire source image. However, in one or more embodiments, at least one transformation may be applied to a source image to generate a transformed image, then pixels for the ROI may be determined from the transformed image (e.g., by cropping the transformed image).

In further respects, multiple images and/or other sensory inputs generated using multiple sensor characteristics or parameters may be applied to the same MLM to generate output data corresponding to respective one or more predictions (after being transformed to reflect one or more common camera characteristics as described herein). For example, a first image(s) may be generated using a first camera(s) mounted at a first position of a vehicle or other machine, and a second image(s) may be generated using a second camera(s) mounted at a second position of the vehicle. The images may be transformed such that they appear to have been captured from a common camera, such as one of the cameras, a different camera not mounted on the vehicle, an ideal or reference camera, etc. Data corresponding to the one or more predictions may be fused to generate a fused prediction, which may be used to control the vehicle. Disclosed approaches may provide for a larger effective field of view than using a single camera to generate predictions, thereby improving the accuracy of predictions.

With reference to FIGS. 1A and 1B, FIG. 1A is a data flow diagram illustrating an example of a machine learning model training system 100A performing a process for transforming sensor data, in accordance with some embodiments of the present disclosure. FIG. 1B is a data flow diagram illustrating an example of a machine learning model inferencing system 100B performing a process for transforming sensor data, in accordance with some embodiments of the present disclosure.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

The MLM training system 100A may include, amongst other elements, an input data pipeline 140 and an MLM trainer 108. The MLM inferencing system 100B may include, amongst other elements, the input data pipeline 140 and a control component(s) 112. In the example shown, the input data pipeline 140 includes a pre-processor 102 and a sensory transformer 104. While the sensory transformer 104 is shown in both the MLM training system 100A and the MLM inferencing system 100B, in at least one embodiment, As an overview, the input data pipeline 140 may be configured to generate, process, pre-process, augment, and/or otherwise prepare input data for use in training an MLM(s) and/or performing inferencing using an MLM(s), such as an MLM(s) 118. In embodiments that include the pre-processor 102, the pre-processor 102 may be configured to perform pre-processing on input data (e.g., real-world data), such as input data 120A or 120B (e.g., sensor data and/or image data) generated using one or more sensors. The sensory transformer 104 may be configured to transform sensor data (e.g., pre-processed or raw sensor data) corresponding to the input data 120A or 120B—to generate transformed sensor data (e.g., transformed data 110A or transformed data 110B)—such as by altering or removing lens distortions, rotating, cropping, and/or extracting ROIs from images (or other sensor data format) corresponding to the sensor data to a field of view of a different physical or virtual sensor.

Thus, in embodiments where the input data pipeline 140 is used in the MLM training system 100A, the MLM trainer 108 may train the MLM(s) using input data (e.g., images and/or frames of sensory input) generated using multiple different sensor characteristics or parameters which may be normalized using the sensory transformer 104. For example, the sensory transformer 104 may normalize the input data 120A from one or more cameras and/or other sensors having different perspectives—using sensor data that is of the same perspective(s) as a reference and/or ideal sensor(s) to train the MLM(s) 118 using at least the transformed data 110A.

Further, in embodiments where the input data pipeline 140 is used in the MLM inferencing system 100B, the MLM(s), such the MLM 118, may perform inferencing using input data (e.g., images and/or frames of sensory input) generated using multiple different sensor characteristics or parameters which may be normalized using the sensory transformer 104. For example, the sensory transformer 104 may normalize the input data 120B from one or more cameras and/or other sensors having different perspectives—using sensor data that is of the same perspective(s) as a reference and/or ideal sensor(s) to perform inferencing using the MLM(s) from at least the transformed data 110B. The control component(s) 112 may use output data generated using the MLM 118 to perform one or more control operations with respect to a machine, such as the vehicle 700.

In one or more embodiments, the sensory transformer 104 may be used to both train the MLM 118, and deploy the MLM 118. For example, for training, the sensory transformer 104 may be used in the MLM training system 100A to normalize input data to reflect sensor characteristics or parameters of a virtual sensor(s). Also, for deployment, the sensory transformer 104 may be used in the MLM inferencing system 100B to normalize input data to reflect sensor characteristics or parameters of the virtual sensor(s).

However, in one or more embodiments, the sensory transformer 104 may be used to train the MLM 118, without using the sensory transformer 104 during deployment of the MLM 118. For example, for training, the sensory transformer 104 may be used in the MLM training system 100A to normalize input data to reflect sensor characteristics or parameters used in the MLM inferencing system 100B to generate the input data during deployment without using the sensory transformer 104. Thus, for training, input data may be transformed to emulate sensor characteristics or parameters of a physical camera(s) that will be used to generate the input data in deployment.

Similarly, in one or more embodiments, the sensory transformer 104 may be used in deployment for the MLM 118, but not for training the MLM 118. For example, for deployment, the sensory transformer 104 may be used in the MLM inferencing system 100B to normalize input data to reflect sensor characteristics or parameters used in the MLM training system 100A to generate the input data without the sensory transformer 104 during training. Thus, for deployment, input data may be transformed to emulate sensor characteristics or parameters of a physical camera(s) that was used to generate the input data in training.

The MLM training system 100A and the MLM inferencing system 100B are described by way of example and not limitation, with respect to an MLM(s) trained for use in computer vision and/or perception operations to navigate a vehicle. However, aspects of the disclosure are more widely applicable to any form of MLM that is trained and/or deployed to make predictions based on sensor data. In some examples, the MLM(s) 118 may be trained to predict trajectory points, a vehicle orientation (e.g., with respect to features of the environment, such as lane markings), and/or a vehicle state (e.g., with respect to an object maneuver, such as a lane change, a turn, a merge, etc.), which may be used for controlling an autonomous vehicle. However, this is not intended to be limiting.

Additionally, the input data pipeline 140 is one example of an input data pipeline 140, which may be used in at least one embodiment, such as for training, inferencing, and/or deploying an MLM(s) for use in computer vision and/or perception operations to navigate a vehicle, or for other purposes. However, the input data pipeline 140 may be varied to include more, fewer, and/or different components and/or processing paths than what is shown in FIGS. 1A and 1B.

Thus, although the sensory transformer 104 is shown in both the MLM training system 100A and the MLM inferencing system 100B, in at least one embodiment the sensory transformer 104 may be included in the input data pipeline 140 for one but not the other. Also, where the sensory transformer 104 is included in both the MLM training system 100A and the MLM inferencing system 100B, the sensory transformer 104 may or may not perform one or more different transformations with respect to each system, as needed, to normalize or otherwise transform the input data 120A and/or the input data 120B.

In at least one embodiment, the input data 120A and/or the input data 120B (also referred to herein as "input data 120") may include image data, sensor data, simulation data, synthetic data, and/or other data types (e.g., map data). By way of example and not limitation, the image data may include data representative of images of a field(s) of view of one or more cameras of a vehicle (e.g., real/physical cameras or simulated), such as stereo camera(s) 868, wide-view camera(s) 870 (e.g., fisheye cameras), infrared camera(s) 872, surround camera(s) 874 (e.g., 360 degree cameras), long-range and/or mid-range camera(s) 898, and/or other camera type of the vehicle 700. In some examples, the image data may be captured by a single camera with a forward-facing, substantially centered field of view with respect to a horizontal axis (e.g., left to right) of the vehicle 700. In a non-limiting embodiment, one or more forward-facing cameras may be used (e.g., a center or near-center mounted camera(s)), such as a wide-view camera 770, a surround camera 774, a stereo camera 768, and/or a long-range or mid-range camera 798. In some examples, more than one camera or other real or virtual sensor (e.g., LIDAR sensor, RADAR sensor, Ultrasonic Sensor, etc.) may be used to incorporate multiple fields of view (e.g., the fields of view of the long-range cameras 798, the forward-facing stereo camera 768, and/or the forward facing wide-view camera 770 of FIG. 7B).

In some examples, the image data may be captured in one format (e.g., RCCB, RCCC, RBGC, etc.), and then converted (e.g., by the pre-processor 102) to another format. Many types of images or formats may be used for the input data 120, for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. It is noted that different formats and/or resolutions could be used training the machine learning model(s) 118 than for inferencing (e.g., during deployment and/or testing of the machine learning model(s) 118).

In some embodiments, one or more portions of the pre-processor 102 may implement a pre-processing image pipeline to process a raw image(s) acquired by a sensor(s) (e.g., camera(s)) and included in the image data to produce pre-processed image data which may represent an input image(s) to the machine learning model(s) 118. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the pre-processor 102, it may include bilateral denoising in the Bayer domain. Where demosaicing is employed by the pre-processor 102, it may include bilinear interpolation. Where histogram computing is employed by the pre-processor 102, it may involve computing a histogram for the C channel, and may be merged with the decompanding or noise reduction in some examples. Where adaptive global tone mapping is employed by the pre-processor 102, it may include performing an adaptive gamma-log transform. This may include calculating a histogram, getting a mid-tone level, and/or estimating a maximum luminance with the mid-tone level.

In various examples, the input data 120 may include the sensor data generated by any number of sensors (physical and/or virtual or simulated), such as LIDAR sensor(s) 764, RADAR sensor(s) 760, ultrasonic sensor(s) 762, microphone(s) 796, and/or other sensor types. The sensor data may represent fields of view and/or sensory fields of sensors (e.g., LIDAR sensor(s) 764, RADAR sensor(s) 760, etc.), and/or may represent a perception of the environment by one or more sensors (e.g., a microphone(s) 796). Sensors such as image sensors (e.g., of cameras), LIDAR sensors, RADAR sensors, SONAR sensors, ultrasound sensors, and/or the like may be referred to herein as perception sensors or perception sensor devices, and the sensor data generated by the perception sensors may be referred to herein as perception sensor data. In some examples, an instance or representation of the sensor data may be represented by an image (e.g., the image data) captured by an image sensor, a depth map generated by a LIDAR sensor, and/or the like. LIDAR data, SONAR data, RADAR data, and/or other sensor data types may be correlated with, or associated with, image data generated by one or more image sensors. For examples, image data representing one or more images may be updated to include data related to LIDAR sensors, SONAR sensors, RADAR sensors, and/or the like, such that the sensor data used for training and/or input to the MLM 118 may be more informative or detailed than image data alone. As such, the MLM 118 may learn to generate predictions using this additional information from any number of perception sensors.

In embodiments where the sensor data is used, the sensors may be calibrated such that the sensor data is associated with pixel coordinates in the image data. The pre-processor 102 may perform pre-processing on the sensor data, which may be similar to that of pre-processing described herein with respect to image data. In some embodiments, such as where the sensor data is indicative of depth (e.g., RADAR data, LIDAR data, etc.), the depth values may be correlated with pixel coordinates in the image data, and then used as an additional (or alternative, in some examples) input to the machine learning model(s) 118. For example, one or more of the pixels may have an additional value associated with it that is representative of depth, as determined from the sensor data.

As described herein, the input data 120 may include other data types, such as map data. The map data may be used by the machine learning model(s) 118 to generate outputs. For example, the map data may include low-resolution map data (e.g., screenshots of a 2D map application with or without guidance). This low-resolution map data may include a basic geometry of the road and/or intersections, such as without additional information such as lane markings, number of lanes, locations of sidewalks, streetlights, stop signs, etc. In other words, in contrast with the map data representing an HD map (e.g., the HD map and/or the HD maps described herein and relied upon by conventional systems), the map data may be less data intense, and used only as an additional data point by the machine learning model(s) 118 when computing outputs.

The map data, in some examples, may include a screenshot or an image (or data representative thereof) that depicts a current lane of the vehicle, a destination lane of the vehicle, the vehicle itself, and/or a representation of the path for the vehicle to take through the lane change. In some examples, the path of the vehicle used for the map data for training may be automatically generated during human-piloted portions of vehicle operation (e.g., as the vehicle is controlled through the environment, the path is populated over the map). In examples, the map data may include commands, such as "at the next intersection, turn right," or the like, and the machine learning model(s) 118 may use this information to generate predictions. In any example, the map data may be generated automatically (e.g., during piloting of the car by a human) and/or may be generated by manual labeling.

In one or more embodiments, at least some of the input data 120 may be generated using a simulator, such as a simulator(s) that is configured to render or otherwise determine images and/or sensor data inputs from one or more virtual environments (e.g., a 3D representation and/or simulation of the real-world). In one or more embodiments, the input data 120 may include all real input data, all simulated or synthetic input data or some combination thereof. Where simulated or synthetic input data is included in the input data 120, that sensory transformer 104 may be used to generate at least some of the synthetic input data. For example, at least some of the functionality of the pre-processor 102 and/or the sensory transformer 104 may be incorporated into the simulator and/or may be otherwise accounted for using the simulator.

As described herein, the sensory transformer 104 may be configured to transform sensor data (e.g., pre-processed or raw sensor data) corresponding to the input data 120—to generate transformed sensor data (e.g., transformed data 110A or transformed data 110B)—such as by altering or removing lens distortions, rotating, cropping, and/or extracting ROIs from images (or other sensor data format) corresponding to the sensor data to a field of view of a different physical or virtual sensor.

The MLM(s) 118 may use as input one or more images or other data representations or instances (e.g., LIDAR data, RADAR data, SONAR data, ultrasound data, etc.) represented by the transformed data 110A and/or the transformed data 110B (also referred to herein as "transformed data 110") to generate output(s). In a non-limiting example, the MLM(s) 118 may take as input an image(s) represented by the input data (e.g., after being processed using the input data pipeline 140 to predict trajectory data, the vehicle orientation, and/or a vehicle state). Although examples are described herein with respect to using neural networks, and specifically convolutional neural networks, as the MLM(s) 118, this is not intended to be limiting. For example, and without limitation, the MLM(s) 118 described herein may include one or more of any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, the sensory transformer 104 may apply one or more transformations to input data to generate the transformed data 110. For example, the sensory transformer 104 may adjust (e.g., removing, reducing, or altering) lens distortion captured by the input data 120. The lens distortion may correspond to lens characteristics and/or intrinsics of a camera and/or other sensor used to generate the input data 120, which may impact the field of view reflected in the input data 120, such as the angle of view. As examples, amongst other transformations, the sensory transformer 104 may transform the angle of view horizontally, vertically, and/or diagonally.

In at least one embodiment, the sensory transformer 104 may apply one or more transformations to the input data 120 to add, remove, or reduce lens distortion that includes perspective distortion, such as wide-angle distortion or extension distortion and/or compression distortion. In at least one embodiment, the sensory transformer 104 may apply one or more transformations to the input data 120 to add, remove, or reduce lens distortion that includes optical distortion, such as barrel distortion, pincushion distortion, and/or mustache distortion. In one or more embodiments, the lens distortion reflected in the input data 120 may be converted to simulate lens distortion of a different lens and/or camera. In at least one embodiment, the sensor data may be converted to a lens-independent format, for example, by removing the lens distortion. For example, images represented by the transformed data 110 may have been transformed so as to appear as if the images were captured by an ideal camera (e.g., an ideal pinhole camera where a single light ray may enter the camera for each point in the scene), as in FIG. 2A.

Referring now to FIG. 2A, FIG. 2A is a data flow diagram illustrating an example data flow 200A of transforming fields of view using a region of interest and one or more intermediate images, in accordance with some embodiments of the present disclosure. As shown, the data flow 200A may include the sensory transformer 104 transforming an image 202, corresponding to the input data 120, into an image 204 based at least on modifying lens distortion depicted in the image 202. For example, the transformation may cause the image 204 to appear as if it were recorded using an ideal pinhole camera. In one or more embodiments, the transformation(s) performed by the sensory transformer 104 may include image rectification using the image 202 to generate the image 204. The transformation may remove distortions that are particular to the camera lens used to record the image 202, rendering the image 204 lens-independent. Similar approaches may be used in embodiments where the lens distortion is converted to emulate lens distortion of a different lens.

In at least one embodiment, the sensory transformer 104 may apply one or more transformations to the input data 120 to shift, rotate, crop and/or extract ROIs from images (or other data representations) corresponding to the input data 120 to a field of view of a different physical or virtual sensor. For example, one or more viewpoint transforms may be used to transform camera images and/or other sensor data to emulate a shift and/or rotation of the sensor, as in FIG. 2A. This may be used to account for cameras and/or sensors positioned differently (e.g., left or right of center, up or down with respect to a ground plane and/or other world-reference point, etc.).

As shown in FIG. 2A, for example, the data flow 200A may include the sensory transformer 104 transforming the image 204 into an image 206 based at least on applying one or more viewpoint transforms to alter the location, position, and orientation or aspects of a pose of the camera. In particular, the alterations may cause the image 206 to appear as if it were recorded using a camera having a different pose.

As a non-limiting example, one or more aspects of the pose may be determined relative to a rear axle of the vehicle 700 (and/or other reference point thereof). For example, the sensory transformer 104 may apply transformations so that the transformed images appear as if they were captured using a camera—for example and without limitation—1.47 meters above the rear axle and 1.77 meters in front of the rear axle along the centerline of the vehicle 700. In at least one embodiments, these numbers may correspond to the actual camera placement on vehicles used for data collection. To work on other vehicles in which the camera may be in a different location, this transformation can be applied to the processed images to become nearly independent of the precise camera placement on the vehicle.

Also shown in FIG. 2A, for example, the data flow 200A may include the sensory transformer 104 cropping the image 206 into an image 208 or otherwise extracting an ROI from the image 206 to match a field of view of a different physical or virtual sensor. For example, one or more boundaries 210A, 210B, 210C, and/or 210D (also referred to herein as "boundaries 210") of the ROI may be determined in an image, such as the image 206, with the boundaries 210 corresponding to and being based at least on the field of view. Pixels within the boundaries 210 may be used to generate the ROI corresponding to the field of view (e.g., to define the content of the ROI and/or at least some of the visual information used to generate the ROI). The ROI may be incorporated into at least one image, such as the image 208, which may be used as an input to the MLM 118. As further examples, the ROI may be generated as tensor input data of the MLM 118 without first generating an intermediate image smaller image.

In at least one embodiment, one or more of the boundaries 210 may be determined in world space (e.g., in 3D world coordinates rather than image space). By determining a boundary in world space, the content of the ROI can be made consistent for images generated using different sensor characteristics. In at least one embodiment, side boundaries, such as the boundaries 210D and 210B may be determined to set an angle that defines a horizontal field of view. Applying a flat ground assumption, a top boundary 210A may be selected to align with a horizon line and/or a reference line. A bottom boundary 210C may be adjusted to correspond to a section of the ground of a particular or fixed (e.g., predetermined) width in world space.

In one or more embodiments, the ROI may be defined in the following way: first the horizontal field of view is set to be (as a non-limiting example) 53° wide. Next, applying a flat ground assumption, the top of the ROI is selected to align with the horizon. Finally, the bottom of the ROI is adjusted to correspond to a section of the ground that is 7.6 m wide. With these adjustments in mind, the images may be linearly scaled so that the resulting image is (as an example, non-limiting embodiment) 209 pixels wide and 65 pixels high.

Disclosed approaches may be used to define the ROI so that data representing the sky can be eliminated (disregarded) or otherwise not used, since sky has little bearing on driving. Provided original cameras have sufficient resolution, standardized ROIs can be defined that are largely independent of camera properties. Since there may be bits of the road ahead that may be visible from one camera location and not visible from another, these discrepancies are small when portions of the road are considered that are beyond a few meters in front of the vehicle.

In at least one embodiment, the sensory transformer 104 may perform one or more of the transformations based at least on mapping source areas (each comprising one or more pixels of an image) of a grid or matrix formed by the source areas to cells of a matrix defining corresponding cells and/or pixels of the ROI. For example, each source area of a grid within the boundaries 210 the image 206 may include a single pixel or multiple pixels. And each cell corresponding to the image 208 may correspond to a single pixel or multiple pixels.

In various examples, the sensory transformer 104 may map source areas of the grid or matrix formed by the source areas to cells of the matrix corresponding to the ROI. 3D transformations may be applied using one or more transformation matrices. By way of example and not limitations, a 4×4 matrix may be used for a given transformation. Assuming, by way of example and not limitation, a vector notation for the source data, the sensory transformer 104 may apply a transformation based at least on multiplying all vectors that are to be transformed against the transformation matrix. For example, if the vectors were in 3D Space A, the transformation matrix may describe a new position of 3D Space A relative to 3D Space B. After multiplication, the vectors may then be described in 3D space B. Any number of transform matrices may be used, such as a chain of matrices applied in series for each source area and/or pixel.

Figure 2B:
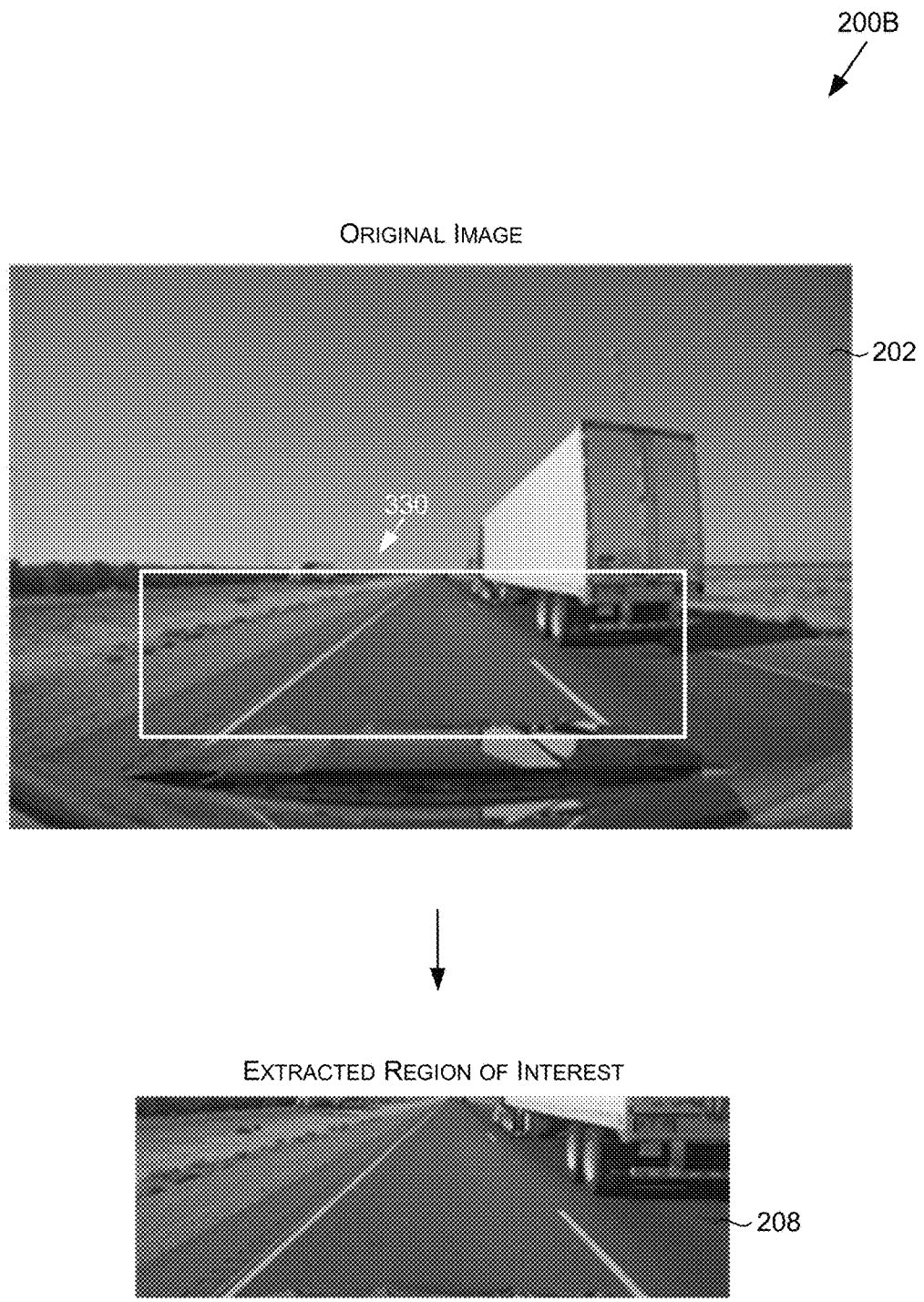
FIG. 2B is a data flow diagram illustrating an example data flow of extracting a region of interest from an image while transforming fields of view, in accordance with some embodiments of the present disclosure.

While the data flow 200A includes various intermediate images between the image 202 and the image 208, in at least one embodiment, more or fewer intermediate images may be used. Referring now to FIG. 2B, FIG. 2B is a data flow diagram illustrating an example data flow 200B of extracting a region of interest from an image while transforming fields of view, in accordance with some embodiments of the present disclosure. As indicated in FIG. 2B, the pixels and/or other data (tensor data) corresponding to the ROI may be extracted directly from the image 202 without generating any intermediate images (in other examples fewer intermediate images than in FIG. 2A may be used using similar techniques).

In at least one embodiment, boundaries 230 may be used to select (e.g., extract) a subset of pixels from the image 202 that correspond to the ROI. One or more of the transformations may be applied to the pixels to produce the image 208 corresponding to the ROI. For example, a transform(s) may be incorporated in a lookup table, which may indicate for each destination pixel(s) in the image 208 corresponding to the ROI, a source pixel(s) in the image 202 to be used to generate the destination pixel(s). In at least one embodiment, the lookup table may have the same dimensions as the extracted ROI. For each cell, the lookup table may specify or otherwise indicate the corresponding source X and Y coordinates (or area) of the image 202.

The sensory transformer 104 may use the lookup table to generate the pixels for the ROI directly from only the relevant pixels of the image 202. By directly generating the pixels for the ROI, one or more transformations may only be applied to pixels needed for generating the ROI, as opposed to an entire image 202. For example, pixels outside of the boundaries 230 need not be used to generate the image 204 and the image 206, as they may not be needed to generate the image 208. This approach may be used to save on storage and processing. For example, while the images 202, 204, and 206 are shows as generally being the same size in FIG. 2A, performing one or more of the transforms may increase the resolution needed for an intermediate image. By way of example and not limitation, in the data flow 200A, a 1920× 1208 resolution image capturing a 60 degree field of view may be projected to a 2400×1600 image having a 120 degree field of view. However, in the data flow 200B, the ROI may be extracted directly without the need to generate the intermediate 2400×1600 image.

Additional or alternative transforms may be applied to the input data 120 for other purposes. In at least one embodiment, a resimulator may be used to generate data for at least some of the training data sets and/or to test the MLM 118. The resimulator may be used to account for real-world tests being time consuming, not easily reproduced, and risky or unsafe. In at least one embodiment, the resimulator may allow for closed loop testing like in a synthetic simulator but working off real sensor recordings instead of synthetic data. In disclosed examples the resimulator may use viewpoint transforms to expand the training data to domains not recorded through human driving. The same strategy may be leveraged to generate testing environments from collected videos or images. The resimulator may provide simulated data without the need to design simulated cities and roads (e.g., in a photorealistic simulation produced from rendering 3D graphics) while reproducing the same or similar scenarios of real-world failures useful for simulation.

The resimulator may use an approach analogous to video-replay, except the system under test may be free to control the car as if operating in a synthetic simulation. At each new state of simulation, sensor data may be produced for the cameras through a viewpoint transform from the closest frame in the recording. The input data 120 may have been generated with the vehicle approximately centered on the road. The viewpoint transform may be used to simulate the vehicle driving at different locations of the road, such as off-center, turning off-center, etc. As long as the system under test does not deviate too much from the recorded path, sensor data can always be available. If the network deviates too much from the recorded path, then there may not be sufficient sensor information available to apply transformations; therefore in these instances the simulated vehicle may be reset to the center of the road. In at least one embodiment the viewpoint transforms may be included in the transforms performed by the sensory transformer 104 in the data flow 200A or the data flow 200B (e.g., by transforming input data to the pose relative to the vehicle while accounting for the pose of the vehicle in the world).

The same strategy may be leveraged to generate testing environments from collected videos or images. The resimulator may provide simulated data without the need to design simulated cities and roads (e.g., in a photorealistic simulation produced from rendering 3D graphics) while reproducing the same or similar scenarios of real-world failures useful for simulation.

Figure 3:
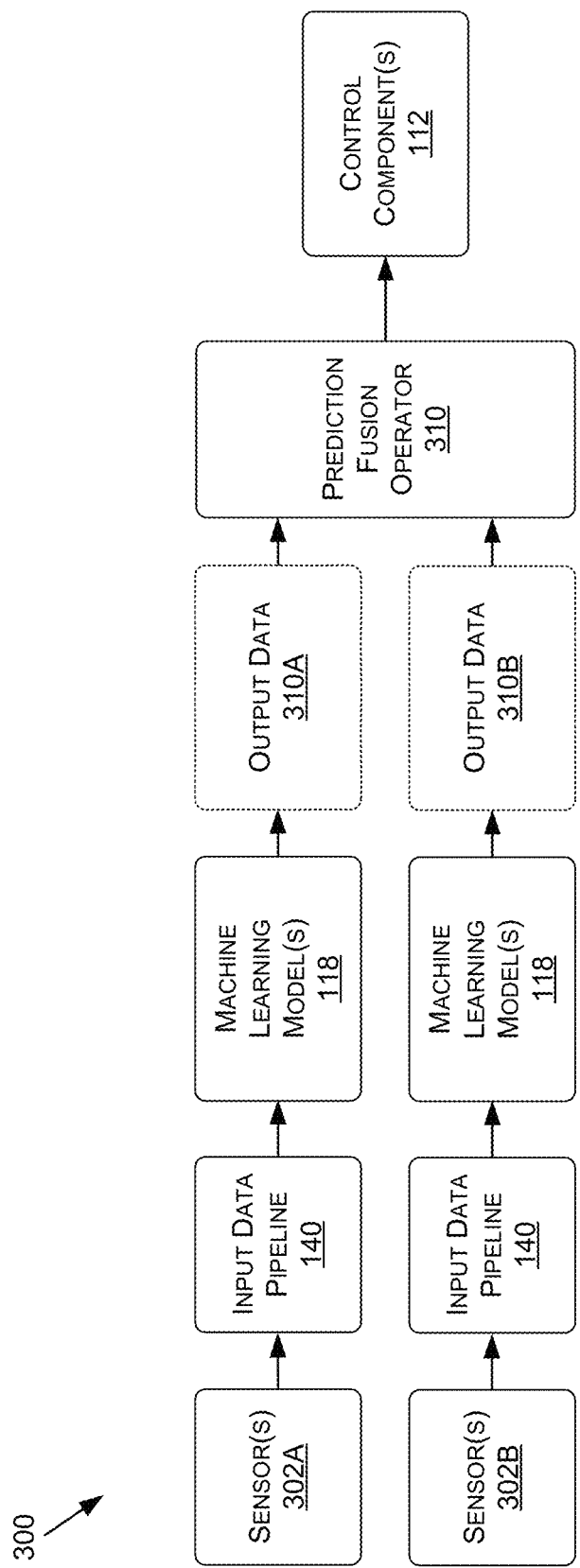
FIG. 3 is a data flow diagram illustrating an example of a machine learning model inferencing system performing a process for transforming sensor data associated with multiple sensors and fusing corresponding predictions, in accordance with some embodiments of the present disclosure.

Now referring to FIG. 3, FIG. 3 is a data flow diagram illustrating an example of a machine learning model inferencing system 300 performing a process for transforming sensor data associated with multiple sensors and fusing corresponding predictions, in accordance with some embodiments of the present disclosure. The MLM inferencing system 300 may include any number of sensors, such as a sensor 302A (e.g., a first camera) and a sensor 302B (e.g., a second camera), where the MLM 118 may perform a set of one or more predictions for each sensor (or set of sensors). For example, the input data 120B from the sensor 302A may be transformed using the input data pipeline 140, then applied to the MLM 118 to generate output data 310A indicative of a first set of predictions. The input data 120B from the sensor 302B may also be transformed using the input data pipeline 140, then applied to the MLM 118 to generate output data 310B indicative of a second set of predictions. The prediction fusion operator 310 may fuse the first set of predictions with the second set of predictions to generate a fused set of predictions. The fused set of predictions may then be used by the control component 112.

Using the MLM inferencing system 300, multiple images and/or other sensory inputs generated using multiple sensor characteristics or parameters may be applied to the same MLM 118 to generate the output data 310A and 310B corresponding to respective one or more predictions (after being transformed to reflect one or more common camera characteristics as described herein). For example, a first image(s) may be generated using the sensor 302A mounted at a first position of the vehicle 700, and a second image(s) may be generated using the sensor 302B mounted at a second position of the vehicle 700. The images may be transformed such that they appear to have been captured from a common camera (e.g., in terms of perspective, lens distortion, field of view, and/or other camera characteristics), such as one of the sensor 302A or 302B, a different sensor not mounted on the vehicle 700 (e.g., used for training the MLM 118), an ideal or reference sensor, etc. The prediction fusion operator 310 may use any suitable approach to fuse the prediction sets, which may include combining, selecting, and/or otherwise aggregating corresponding predictions across sets. Disclosed approaches may provide for a larger effective field of view than using a single sensor to generate predictions, thereby improving the accuracy of predictions.

While two sensors 302A and 302B are shown, any number of sensors may be used. Further, the input data pipeline 140 may refer to the same instance of the input data pipeline 140 or multiple instances of the input data pipeline 140 (e.g., each with a different configuration to account for any differences between the sensors 302A and 302B and/or corresponding input data 120B). Using multiple instances of the input data pipeline 140 may allow for the input data 120B from each sensor 302A and 302B to be processed in parallel (e.g., rather than in serial using a single instance). Similarly, the MLM 118 may refer to the same instance of the MLM 118 or multiple instances or copies of the MLM 118. Using multiple instances of the MLM 118 may allow for the transformed data 110B from each sensor 302A and 302B to be processed in parallel (e.g., rather than in serial using a single instance).

In at least one embodiment, the control component(s) 112 of the MLM inferencing system 100B may be of an autonomous vehicle and a during deployment, an output(s) from the MLM 118 may be used by the control component(s) 112 of the autonomous vehicle (e.g., controller(s) 736, ADAS system 738, SOC(s) 704, and/or other components of the autonomous vehicle 700) to aid the vehicle in navigating (e.g., path planning) an environment. For example, the output may be used by the control component(s) 112 may correspond to one or more other components of the vehicle and/or the autonomous driving software stack (e.g., component(s) of a planning layer, a control layer, a perception layer, and/or another layer of the stack).

In at least one embodiment, the MLM trainer 108 of the MLM training system 100A may train the MLM 118 using any suitable approach. As a non-limiting example, the MLM trainer 108 may use, from the input data provided using the input data pipeline 140, image data representative of one or more images (or other data representations) and load the data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the MLM(s) 118.

Figure 4:
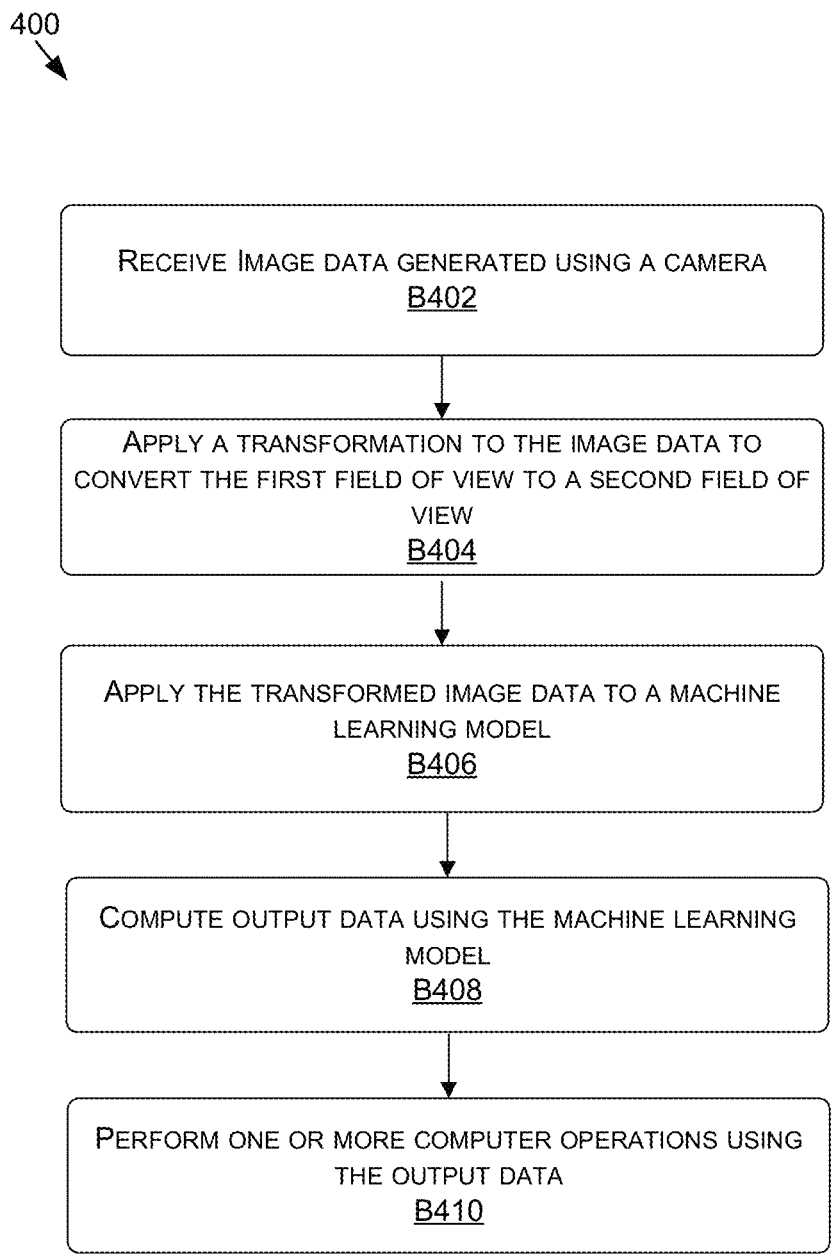
FIG. 4 is a flow diagram showing a method for a machine learning model to generate one or more predictions using image data having a transformed field of view, in accordance with some embodiments of the present disclosure.

Now referring to FIG. 4, each block of method 400, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to FIG. 1. However, these methods may additionally or alternatively be executed by any one system, or any combination of systems, including, but not limited to, those described herein.

FIG. 4 is a flow diagram showing a method 400 for a machine learning model to generate one or more predictions using image data having a transformed field of view, in accordance with some embodiments of the present disclosure. The method 400, at block B402, includes receiving image data generated using a camera. For example, the sensory transformer 104 may receive image data generated using a first camera having a first field of view. The first camera associated with the vehicle 700 in an environment.

The method 400, at block B404, includes applying a transformation to the image data to convert the first field of view to a second field of view. For example, the sensory transformer 104 may apply a transformation to the image data to generate transformed image data. The transformation may convert the first field of view to a second field of view of a second camera.

The method 400, at block B406, includes applying the transformed image data to a machine learning model. For example, the transformed image data may be applied to the MLM 118 which may have been trained using training images corresponding to the second field of view of the second camera.

The method 400, at block B408, includes computing output data using the machine learning model. For example, the MLM 118 may be used to compute output data representative of a prediction made using the MLM 118.

The method 400, at block B410, includes performing one or more computer operations using the output data. For example, the output data may be transmitted to the control component 112 cause the vehicle 700 to perform one or more operations based at least on the prediction.

Figure 5:
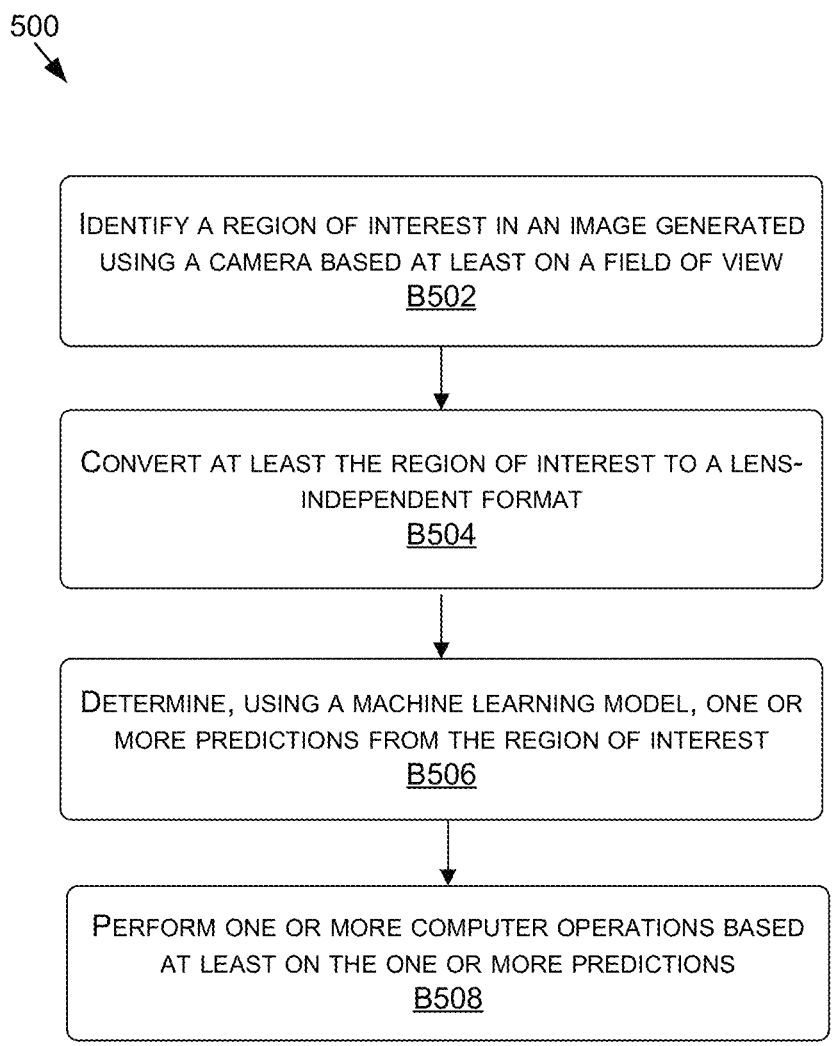
FIG. 5 is a flow diagram showing a method for a machine learning model to generate one or more predictions using a region of interest having a lens-independent format, in accordance with some embodiments of the present disclosure.

Now referring to FIG. 5, FIG. 5 is a flow diagram showing a method 500 for a machine learning model to generate one or more predictions using a region of interest having a lens-independent format, in accordance with some embodiments of the present disclosure. The method 500, at block B502, includes identifying a region of interest in an image generated using a camera based at least on a field of view. For example, the sensory transformer 104 may identify a region of interest in an image generated using a camera based at least on a field of view depicted in training images used to train the MLM 118.

The method 500, at block B502, includes converting at least the region of interest to a lens-independent format used for the training images. For example, the sensory transformer 104 may convert at least the region of interest to a lens-independent format used for the training images.

The method 500, at block B506, includes determining, using a machine learning model, one or more predictions from the region of interest. For example, the MLM 118 may be used to determine one or more predictions from the region of interest having the lens-independent format.

The method 500, at block B508, includes performing one or more computer operations using the output data. For example, the output data may be transmitted to the control component 112 cause the vehicle 700 to perform one or more operations based at least on the prediction.

Figure 6:
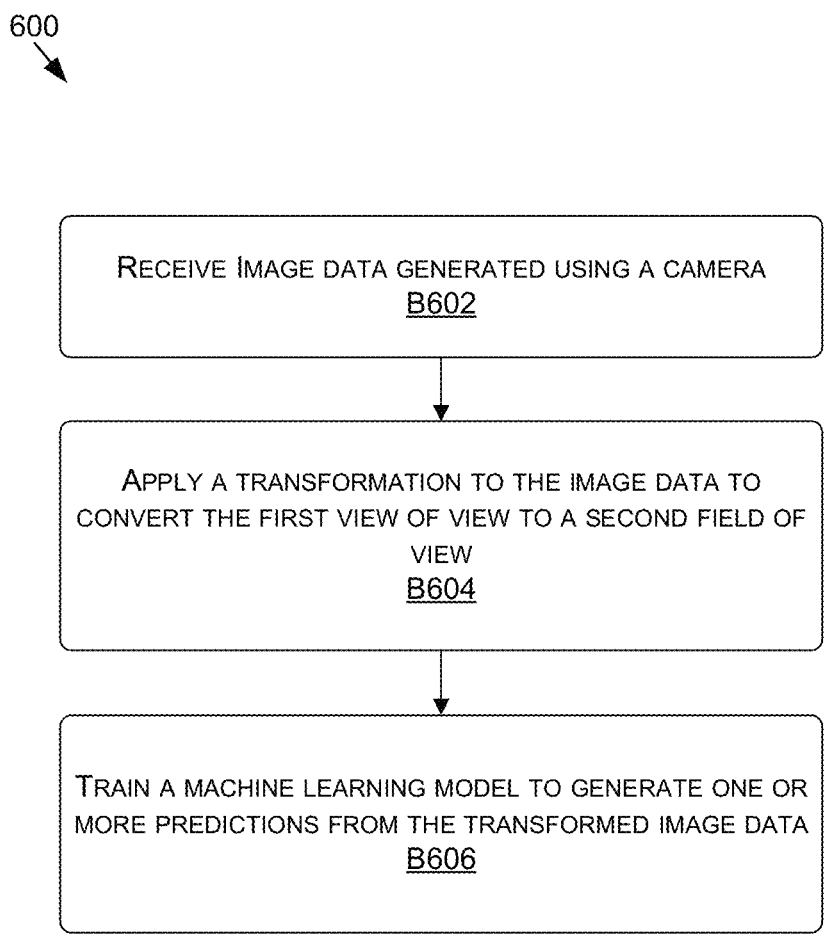
FIG. 6 is a flow diagram showing a method for training a machine learning model to generate one or more predictions using image data having a transformed field of view, in accordance with some embodiments of the present disclosure.

Now referring to FIG. 6, FIG. 6 is a flow diagram showing a method 600 for training a machine learning model to generate one or more predictions using image data having a transformed field of view, in accordance with some embodiments of the present disclosure. The method 600, at block B602, includes receiving image data generated using a camera having a first field of view in an environment. For example, the sensory transformer 104 may receive image data generated using a camera having a first field of view in an environment.

The method 600, at block B604, includes applying a transformation to the image data to convert the first field of view to a second field of view. For example, the sensory transformer 104 may apply a transformation to the image data to generate transformed image data. The transformation may convert the first field of view to a second field of view.

The method 600, at block B606, includes training a machine learning mode to generate one or more predictions from the transformed image data. For example, the MLM trainer 108 may train the MLM 118 to generate one or more predictions from the transformed image data.

Example Autonomous Vehicle

Figure 7A:
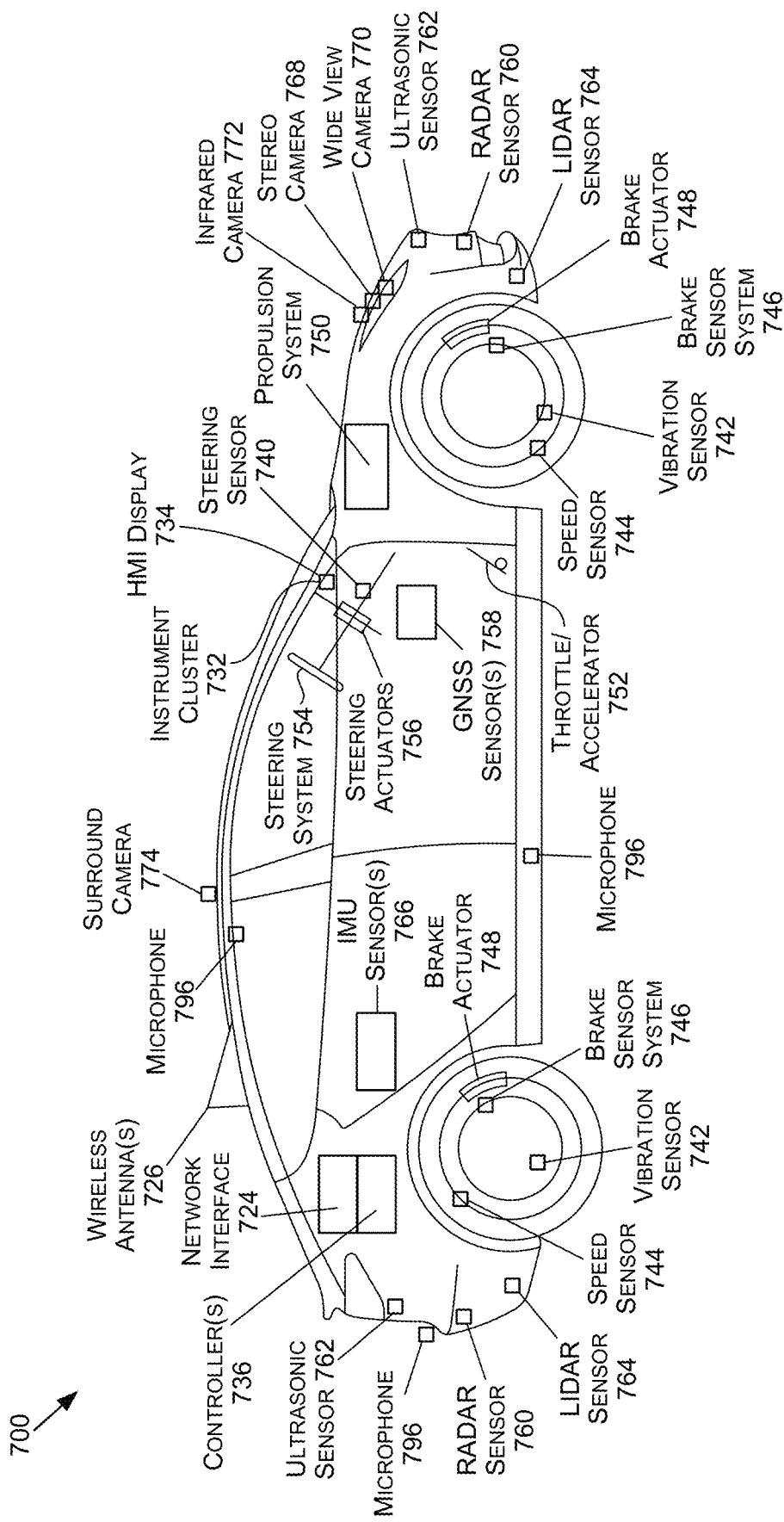
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
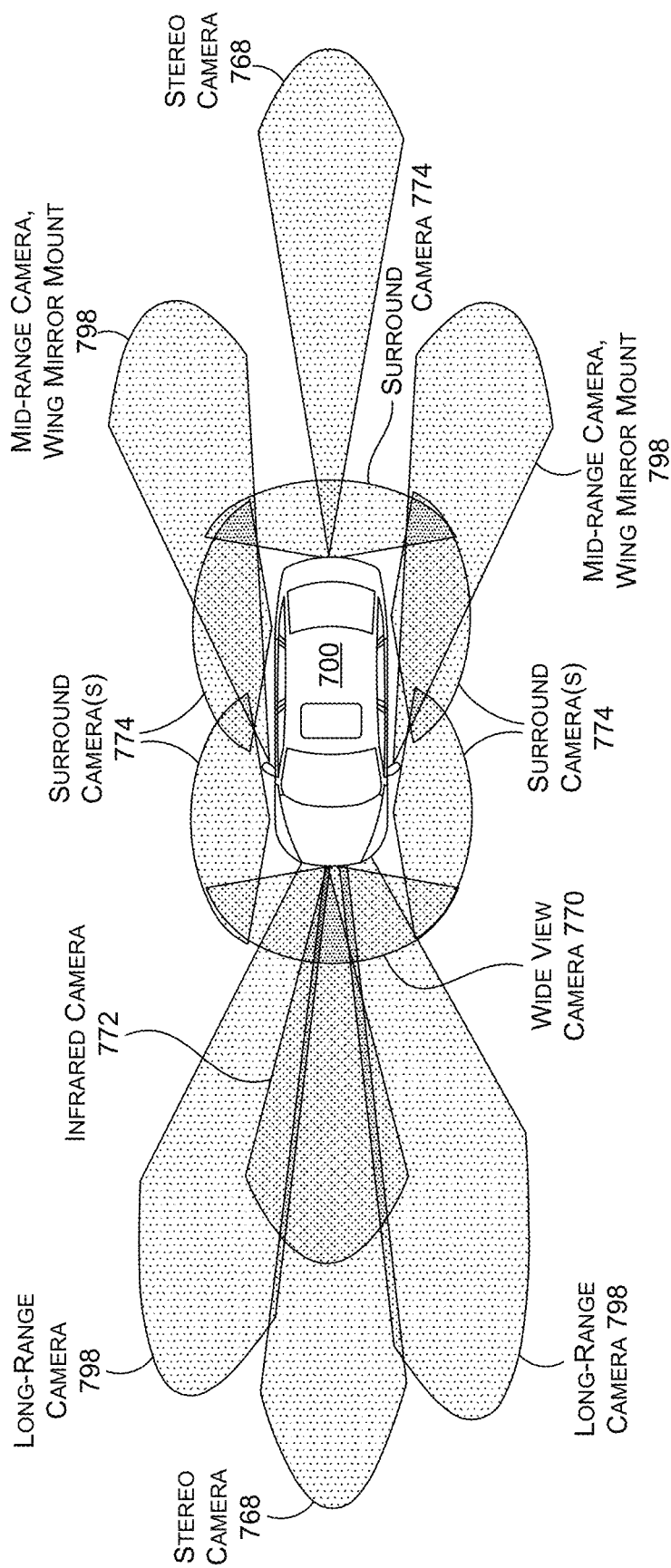
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
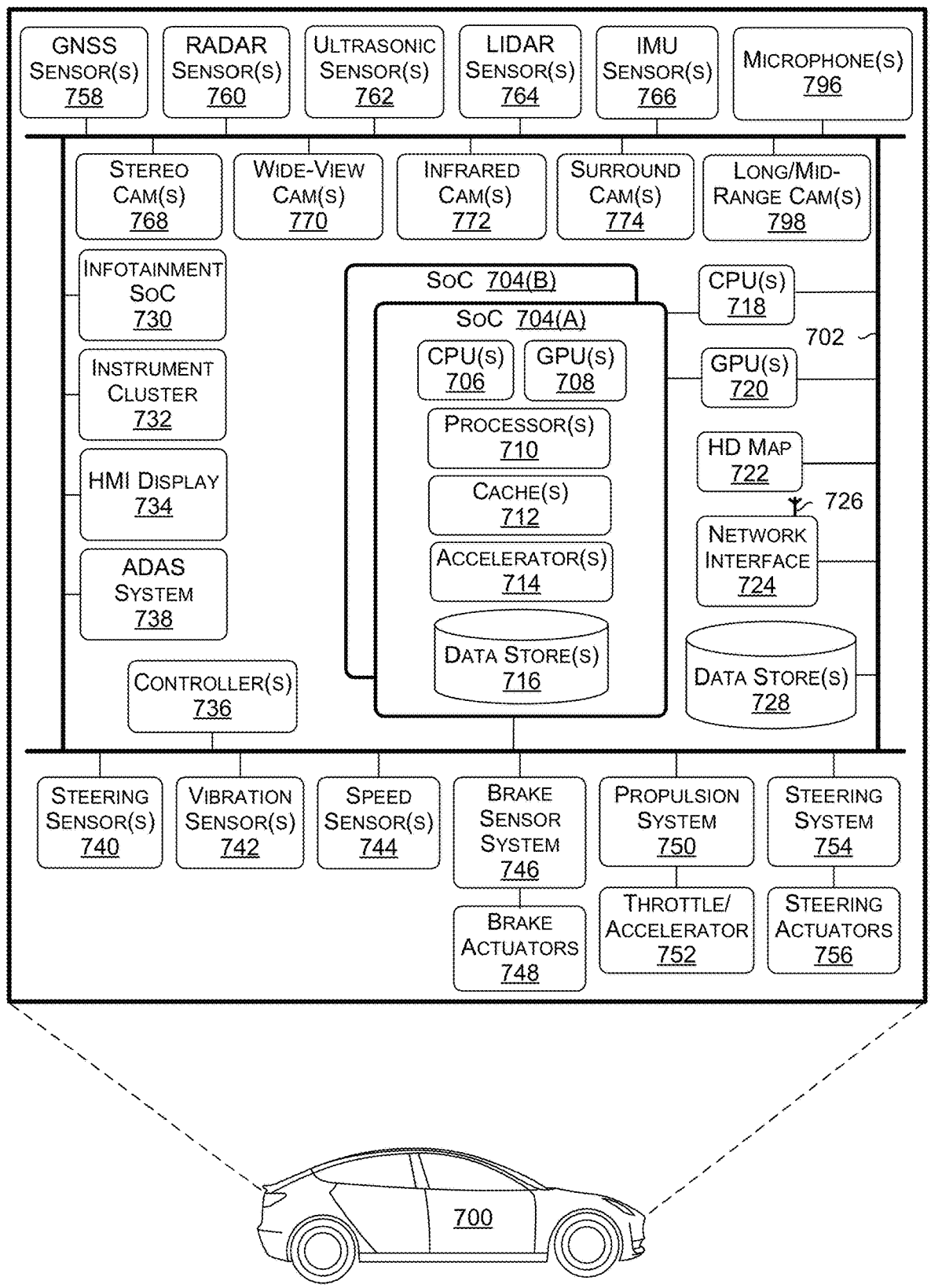
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
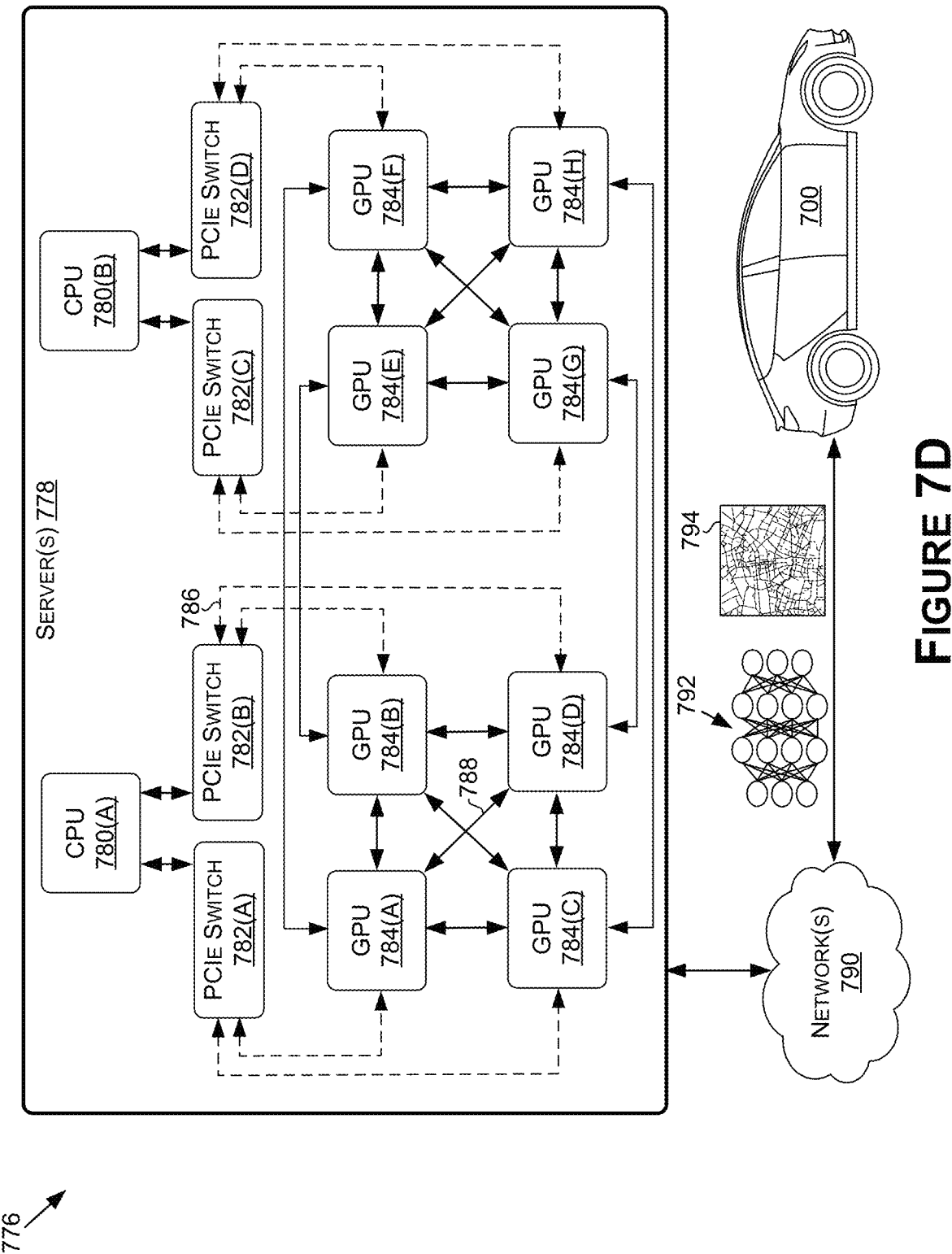
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
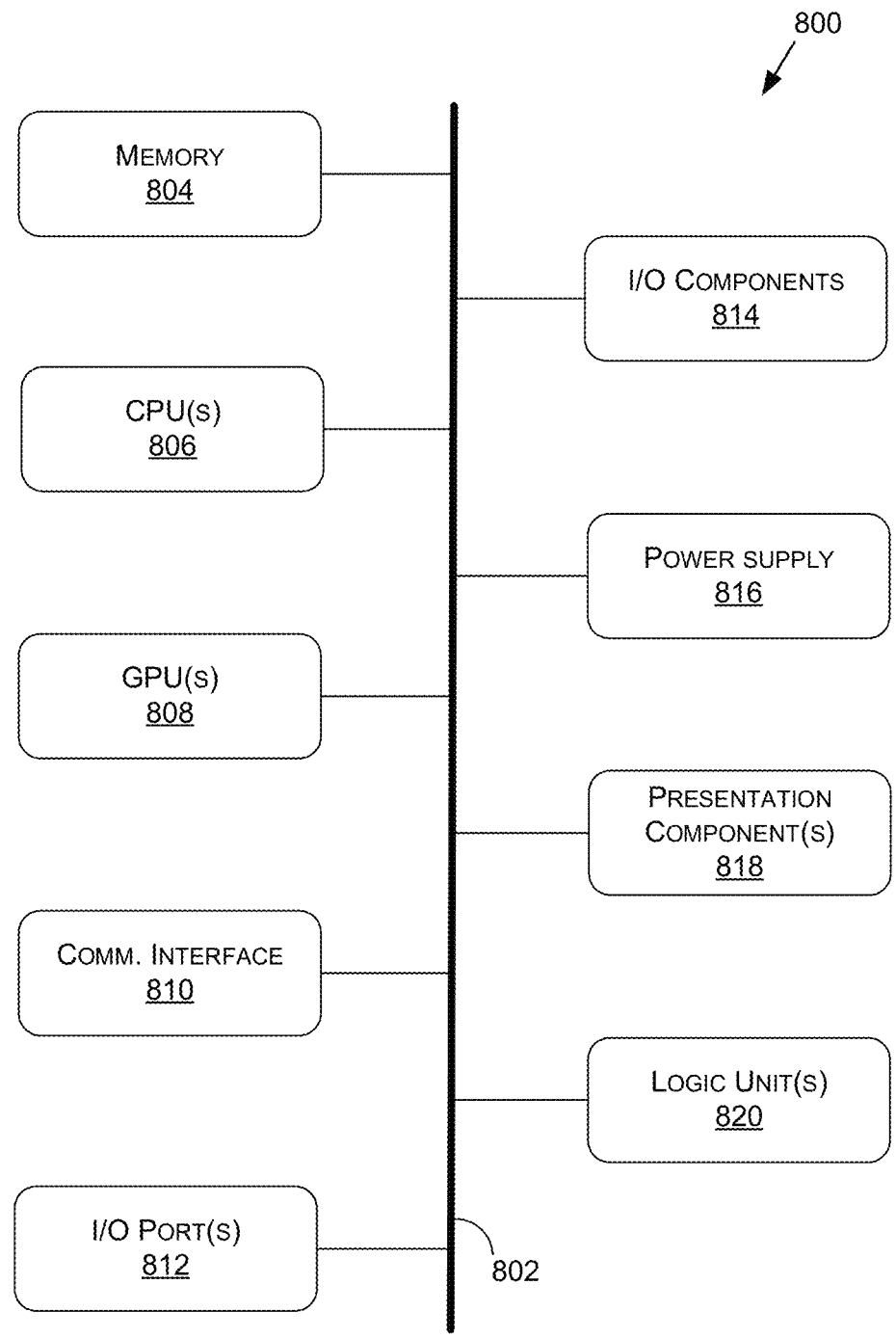
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
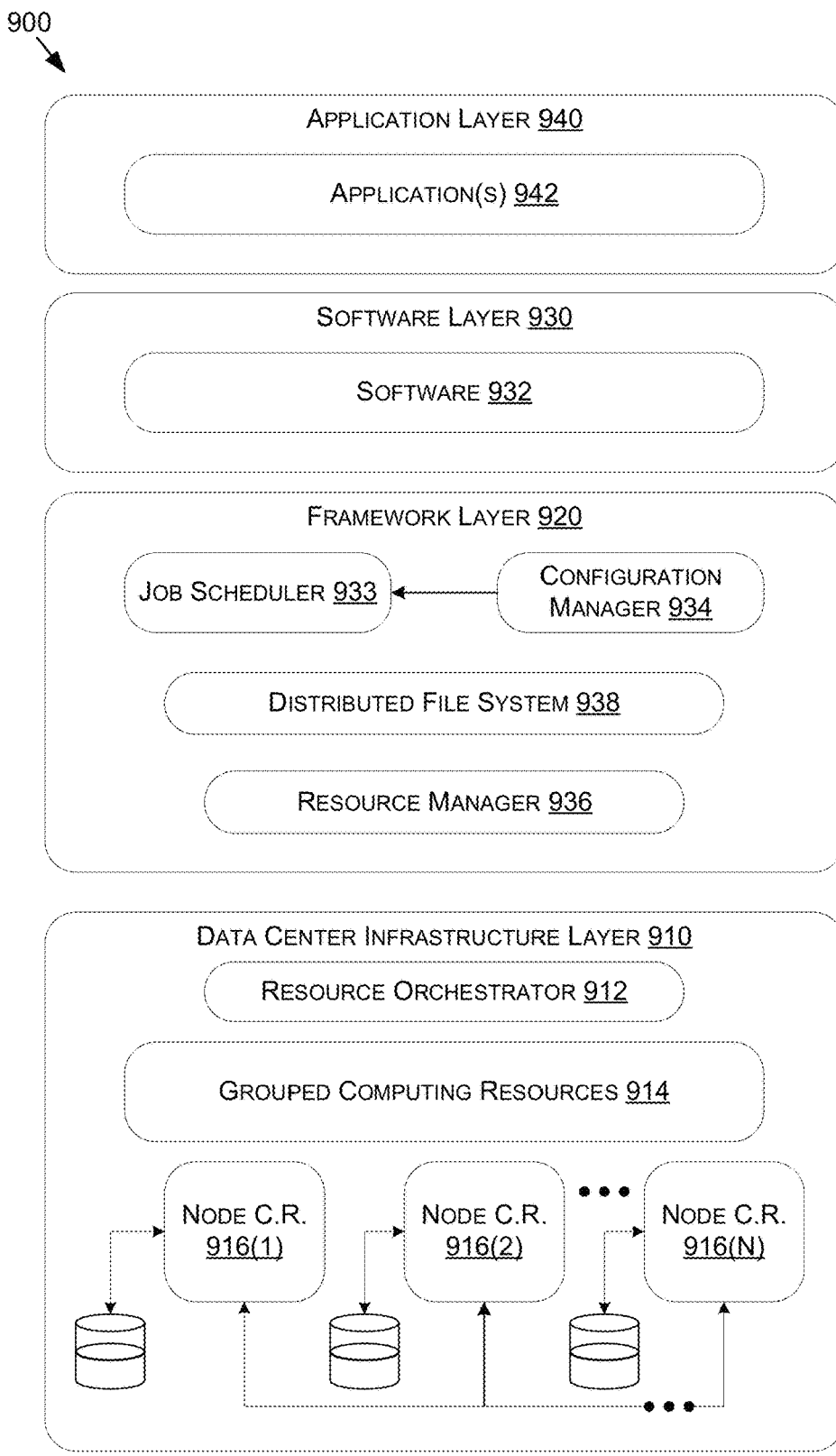
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-

916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer implemented method comprising:
   receiving image data generated using a first camera having a first perspective view from a first mounting location of a vehicle associated with the first camera;
   applying a transformation to the image data to generate transformed image data, the transformation converting at least the first mounting location of the first perspective view to a second mounting location to simulate a second camera having a second perspective view being mounted to the vehicle at the second mounting location based at least on the second mounting location being used with respect to training images used to train a machine learning model;
   applying the transformed image data to the machine learning model trained using the training images corresponding to the second mounting location;
   computing, using the machine learning model and based at least on the machine learning model processing the transformed image data, output data representative of one or more predictions corresponding to the transformed image data; and
   transmitting the output data to cause the vehicle to perform one or more operations based at least on the one or more predictions.

2. The computer implemented method of claim 1, wherein the training images were generated using a physical camera mounted to the vehicle or a different vehicle at the second mounting location.

3. The computer implemented method of claim 1, wherein:
   the converting includes converting a first lens distortion captured by the image data and associated with the first camera to a second lens distortion associated with the second camera; and
   the applying the transformed image data includes applying the transformed image data having the second lens distortion as an input to the machine learning model.

4. The computer implemented method of claim 1, wherein:
   the converting includes:
      determining boundaries that define a region of interest corresponding to the second perspective view in world space; and
      extracting the region of interest from one or more images that correspond to the image data; and
   the applying the transformed image data includes applying the region of interest extracted from the one or more images as an input to the machine learning model.

5. The computer implemented method of claim 1, wherein:
   the converting includes:
      determining boundaries that define a region of interest corresponding to the second perspective view in one or more images that corresponds to the transformed image data;
      identifying pixels that correspond to the region of interest using the boundaries; and
      applying a viewpoint transformation to the region of interest using the pixels identified using the boundaries to extract the region of interest from the one or more images; and
   the applying the transformed image data includes applying the region of interest extracted from the one or more images as an input to the machine learning model.

6. The computer implemented method of claim 1, wherein the method further includes:
   determining, using the machine learning model, one or more second predictions from second transformed image data generated using a third camera having a third perspective view and converted to the second perspective view of the second camera; and
   fusing the one or more predictions with the one or more second predictions to determine one or more fused predictions, wherein the one or more operations are based at least on the one or more fused predictions.

7. The computer implemented method of claim 1, wherein the one or more predictions include one or more trajectory points in world space of a trajectory for the vehicle through an environment.

8. The computer implemented method of claim 1, wherein the second camera has a same facing direction relative to the vehicle as the first camera and the second camera has a fixed pose.

9. A system comprising:
   one or more processing units to execute operations comprising:
      identifying image coordinates that define a region of interest within an image generated using a first camera;

transforming the region of interest based at least on converting the first camera to a mounting location to simulate a second camera being mounted to a machine at the mounting location based at least on the mounting location being used in training images used to train a machine learning model;

determining one or more predictions based at least on applying the region of interest that corresponds to the mounting location to the machine learning model; and transmitting data to cause the machine to perform one or more operations based at least on the one or more predictions.

10. The system of claim 9, wherein the transforming further includes removing lens distortions in at least the region of interest caused by a lens of the first camera to concert the region of interest to a lens-independent format, and the region of interest that is applied to the machine learning model has the lens-independent format.

11. The system of claim 9, wherein the transforming further includes converting one or more intrinsics of the first camera to one or more intrinsics of the second camera used to generate the training images, and the region of interest that is applied to the machine learning model has the one or more intrinsics of the second camera.

12. The system of claim 9, wherein the converting includes:
selecting a set of pixels in the image that correspond to the region of interest based at least on the identifying; and
based at least on the selecting, adjusting a second field of view depicted in the set of pixels to generate an input image of the region of interest depicting the mounting location, wherein the one or more predictions are determined from the input image.

13. The system of claim 9, wherein the transforming includes applying a viewpoint transform to a subset of the image, the subset representing the region of interest.

14. The system of claim 9, wherein identifying the region of interest includes determining one or more boundaries of the region of interest using one or more reference lines in an environment depicted in the image.

15. A processor comprising:
one or more circuits to:
receive image data generated using a first camera associated with a machine, the first camera having a first field of view in an environment,
apply a transformation to the image data to generate transformed image data, the transformation converting a first mounting location corresponding to the first field of view to a second field of view that comprises a perspective view to simulate a second camera mounted to the machine at a second mounting location, and
update one or more parameters of a machine learning model such that the machine learning model is trained to generate one or more predictions from the transformed image data capturing the second field of view that comprises the perspective view from the second mounting location.

16. The processor of claim 15, wherein the second camera corresponds to a physical camera and the processor is further to update the one or more parameters of the machine learning model based at least on applying at least one image generated using the physical camera, mounted at the second mounting location, to the machine learning model.

17. The processor of claim 15, wherein the simulated second camera has a fixed pose throughout training the machine learning model.

18. The processor of claim 15, wherein:
the converting includes:
determining boundaries that define a region of interest corresponding to the second field of view in world space; and
extracting the region of interest from one or more images that correspond to the image data;
the updating the one or more parameters includes applying the region of interest extracted from the one or more images as an input to the machine learning model.

19. The processor of claim 15, wherein:
the converting includes:
determining boundaries that define a region of interest corresponding to the second field of view in one or more images that corresponds to the image data;
identifying pixels that correspond to the region of interest using the boundaries; and
applying a viewpoint transformation to the pixels identified using the boundaries to extract the region of interest from the one or more images; and
the updating the one or more parameters includes applying the region of interest extracted from the one or more images as an input to the machine learning model.

20. The processor of claim 15, wherein the transformation uses one or more references points corresponding to one or more axles of the machine.

* * * * *